US010272797B2

(12) United States Patent
Lee et al.

(10) Patent No.: US 10,272,797 B2
(45) Date of Patent: Apr. 30, 2019

(54) METHOD AND SYSTEM FOR CONTROLLING CHARGING OF LOW-VOLTAGE BATTERY

(71) Applicant: Hyundai Motor Company, Seoul (KR)

(72) Inventors: Kyu Il Lee, Gyeonggi-do (KR); Boung Ho Min, Gyeonggi-Do (KR); Kyung Won Suh, Seoul (KR)

(73) Assignee: Hyundai Motor Company, Seoul (KR)

( * ) Notice: Subject to any disclaimer, the term of this patent is extended or adjusted under 35 U.S.C. 154(b) by 391 days.

(21) Appl. No.: 15/137,186

(22) Filed: Apr. 25, 2016

(65) Prior Publication Data

US 2017/0166080 A1 Jun. 15, 2017

(30) Foreign Application Priority Data

Dec. 14, 2015 (KR) .................. 10-2015-0178069

(51) Int. Cl.
| | |
|---|---|
| *B60L 1/00* | (2006.01) |
| *B60L 11/18* | (2006.01) |
| *H02J 7/00* | (2006.01) |
| *H02J 7/34* | (2006.01) |
| *H02J 1/00* | (2006.01) |

(52) U.S. Cl.
CPC ............ *B60L 11/1887* (2013.01); *B60L 1/00* (2013.01); *B60L 11/1811* (2013.01); *B60L 11/1859* (2013.01); *B60L 11/1861* (2013.01); *B60L 11/1868* (2013.01); *H02J 7/00* (2013.01); *H02J 7/0088* (2013.01); *H02J 7/34* (2013.01); *B60L 2210/12* (2013.01); *B60L 2240/547* (2013.01); *H02J 2001/004* (2013.01); *Y02T 10/7044* (2013.01); *Y02T 10/7066* (2013.01); *Y02T 10/7233* (2013.01); *Y02T 90/34* (2013.01)

(58) Field of Classification Search
CPC .............. B60L 11/1811; B60L 11/1861; B60L 11/1887
USPC .................................................. 320/101, 104
See application file for complete search history.

(56) References Cited

U.S. PATENT DOCUMENTS 5,479,085 A * 12/1995 Honda ............... G01R 31/3648
320/134
2009/0288896 A1* 11/2009 Ichikawa ............... B60K 6/365
180/65.265

(Continued)

FOREIGN PATENT DOCUMENTS

| JP | 2009-110757 A | 5/2009 |
| KR | 10-2009-0059175 A | 6/2009 |

(Continued)

*Primary Examiner* — Richard Isla
*Assistant Examiner* — Johali A Torres Ruiz
(74) *Attorney, Agent, or Firm* — Mintz Levin Cohn Ferris Glovsky and Popeo, P.C.; Peter F. Corless (57) ABSTRACT

A system and method for controlling charging of a low-voltage battery are provided. The method includes determining a state of charge of the low-voltage battery of a vehicle based on a voltage of the low-voltage battery and determining a state of charge of the low-voltage battery based on a magnitude of consumed power of a low-voltage direct current (DC) converter (LDC) providing charged power to the low-voltage battery during a period in which vehicle start-up is performed. A charged voltage of the low-voltage battery is then set based on a determination result of the state of charge of the low-voltage battery.

13 Claims, 5 Drawing Sheets

(56) References Cited

U.S. PATENT DOCUMENTS

2011/0093223 A1    4/2011  Quet
2015/0115892 A1*  4/2015  Chen .................... H02J 7/0014
                                                                                  320/134

FOREIGN PATENT DOCUMENTS

| KR | 10-2009-0125370 A | 12/2009 |
|----|-------------------|---------|
| KR | 10-2010-0029646 A | 3/2010  |
| KR | 10-2010-0031964 A | 3/2010  |
| KR | 10-2013-0116419 A | 10/2013 |
| KR | 2013-0129286 A    | 11/2013 |
| KR | 2014-0115446 A    | 10/2014 |

* cited by examiner

| STATE OF CHARGE | FULLY CHARGED | NORMAL | DISCHARGED |
|---|---|---|---|
| BASE CHARGED VOLTAGE | 12.5V | 13V | 14V |

FIG. 6

| DRIVING MODE | Regen. Mode | Idle Mode | Power Assist Mode | FC Stop Mode | Em. EV Mode |
|---|---|---|---|---|---|
| CHARGED VOLTAGE | 14.5V | BASE CHARGED VOLTAGE | 13V | BASE CHARGED VOLTAGE | 13V |

| Idle Mode | Normal SOC (55~65%) | Critical High (EXCEEDING 65%) | Critical Low (LESS THAN 50%) | Low SOC (55~50%) |
|---|---|---|---|---|
| CHARGED VOLTAGE | BASE CHARGED VOLTAGE + OFFSET VOLTAGE2 | BASE CHARGED VOLTAGE + OFFSET VOLTAGE1 | BASE CHARGED VOLTAGE + OFFSET VOLTAGE4 | BASE CHARGED VOLTAGE + OFFSET VOLTAGE3 |

FIG. 7

METHOD AND SYSTEM FOR CONTROLLING CHARGING OF LOW-VOLTAGE BATTERY

CROSS REFERENCE TO RELATED APPLICATION

The present application claims priority to Korean Patent Application No. 10-2015-0178069, filed Dec. 14, 2015, the entire contents of which is incorporated herein for all purposes by this reference.

BACKGROUND

1. Technical Field

The present invention relates to a method and a system for controlling charging of a low-voltage battery of a fuel cell vehicle, and more particularly, to a method and a system for controlling charging of a low-voltage battery capable of more precisely determining a state of the low-voltage battery and efficiently charging the low-voltage battery, by determining a state of charge (SOC) of the low-voltage battery based on output power of a low-voltage direct current (DC) converter providing charged power of the low-voltage battery during vehicle start up as well as a voltage of the low-voltage battery.

2. Description of the Related Art

In the related art, a charged voltage of a low-voltage battery is set based on a driving mode of a fuel cell vehicle and a state of charge (SOC) of a high-voltage battery to improve fuel efficiency of the vehicle and stability of a system. However, when a state in which a lamp within the vehicle is turned on and inadvertently left on for a substantial period of time, discharging of a low-voltage (12V) battery occurs. When a voltage control according to the related art is performed in this state, the discharging of the low-voltage battery may be accelerated, and the low-voltage (12V) battery may not be sufficiently charged, and thus the low-voltage battery may be maintained in a discharged state. As a result, the vehicle may not be capable of being started.

The contents described as the related art have been provided merely for assisting in the understanding for the background of the present invention and should not be considered as corresponding to the related aft known to those skilled in the art.

SUMMARY

An object of the present invention is to provide a method and a system for controlling charging of a low-voltage battery capable of more precisely determining a state of the low-voltage battery and efficiently charging the low-voltage battery, by determining a state of charge of the low-voltage battery based on output power of a low-voltage direct current (DC) converter providing charged power of the low-voltage battery during vehicle start up as well as a voltage of the low-voltage battery.

According to an exemplary embodiment of the present invention, a method for controlling charging of a low-voltage battery may include: determining a state of charge of the low-voltage battery of a vehicle based on a voltage of the low-voltage battery; determining a state of charge of the low-voltage battery based on a magnitude of consumed power of a low-voltage direct current (DC) converter (LDC) configured to provide charged power to the low-voltage battery during a period in which start-up of the vehicle is performed; and setting a charged voltage of the low-voltage battery based on a determination result of the state of charge of the low-voltage battery.

In particular, the state of charge of the low-voltage battery may be determined based on a section to which the voltage of the low-voltage battery belongs among a plurality of sections sequentially divided based on a sequence of magnitudes of voltages. Whether the second determination process is executed may be determined based on the state of charge of the low-voltage battery. In the second determination process, the magnitude of the consumed power of the low-voltage DC converter may be detected from a point in time in which an operation of the low-voltage DC converter supplying the power to the low-voltage battery is started after the initiation of the vehicle start-up to a point in time which in which the completion of the vehicle start-up. In addition, the state of charge of the low-voltage battery may be determined based on an accumulation time in a section to which the magnitude of the consumed power of the low-voltage DC converter belongs among a plurality of sections sequentially divided based on a sequence of magnitudes of power.

Boundary values between the plurality of sections sequentially divided based on the sequence of the magnitudes of the power may be set based on whether a high-load electric component configured to receive the power from the low-voltage DC converter during the start-up of the vehicle is operated. Further, the setting process may include: setting a base charged voltage of the low-voltage battery based on a determination result of the state of charge of the low-voltage battery; and setting the charged voltage for the low-voltage battery based on the base charged voltage and a driving mode of the vehicle. The driving mode may include a plurality of modes, in at least one of which the charged voltage may be set by adding an offset value preset based on a state of charge of a high-voltage battery to the base charged voltage.

According to another exemplary embodiment of the present invention, a method for controlling charging of a low-voltage battery may include: determining a state of charge of the low-voltage battery of a vehicle based on a section to which a voltage of the low-voltage battery belongs among a plurality of sections sequentially divided based on a sequence of magnitudes of voltages in a no-load state at the early state of start-up of the vehicle; determining a state of charge of the low-voltage battery based on an accumulation time in a section to which a magnitude of consumed power of a low-voltage DC converter configured to provide charged power to the low-voltage battery belongs among a plurality of sections sequentially divided based on a sequence of magnitudes of power during a period when the vehicle start-up is performed; setting a base charged voltage of the low-voltage battery based on a determination result of the state of charge of the low-voltage battery; and setting a charged voltage for the low-voltage battery based on the base charged voltage and a driving mode of the vehicle.

The second determination process may be performed when the determined state of charge of the low-voltage battery is a state between a fully charged state and a discharged state. Boundary values between the plurality of sections sequentially divided based on the sequence of the magnitudes of the power may be set based on whether a high-load electric component receiving the power from the low-voltage DC converter during the vehicle start-up is operated. The driving mode may include a plurality of modes, in at least one of which the charged voltage may be set by adding an offset value preset based on a state of charge of a high-voltage battery to the base charged voltage.

According to still another exemplary embodiment of the present invention, a system for controlling charging of a low-voltage battery may include: a fuel cell stack; a high-voltage direct current converter configured to receive power from the fuel cell stack; a high-voltage battery configured to receive a voltage down-converted by the high-voltage direct-current (DC) converter; a low-voltage DC converter connected to a high-voltage bus terminal between the fuel cell stack and the high-voltage DC converter and configured to down-convert a voltage; a low-voltage battery configured to be charged by the voltage converted by the low-voltage DC converter; and a controller configured to determine a state of charge of the low-voltage battery based on a voltage of the low-voltage battery, determine a state of charge of the low-voltage battery based on a magnitude of consumed power of the low-voltage DC converter during a period in which the vehicle start-up is performed, and set a charged voltage of the low-voltage battery based on a determination result of the state of charge of the low-voltage battery.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, methods and systems for controlling charging of a low-voltage battery according to various exemplary embodiments of the present invention will be described with reference to the accompanying drawings.

Figure 1:
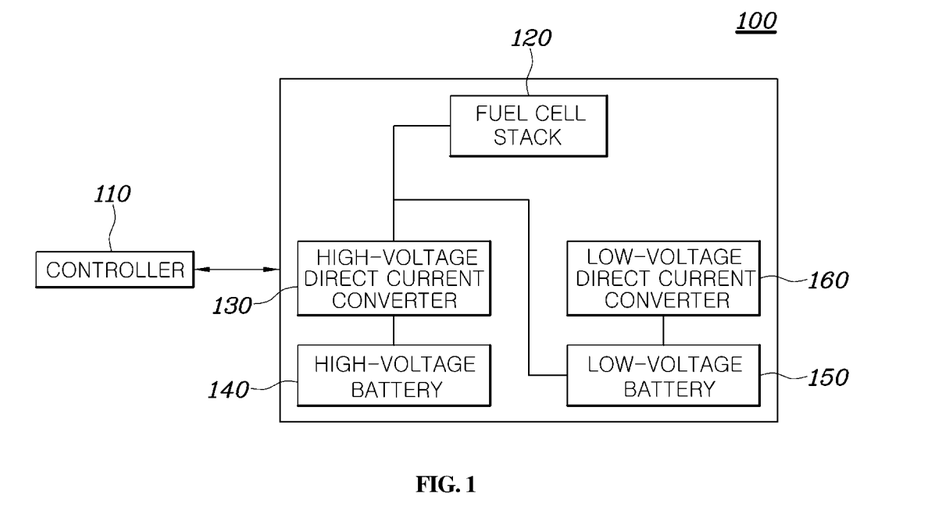
FIG. 1 is a block diagram of a system for controlling charging of a low-voltage battery according to an exemplary embodiment of the present invention.

FIG. 1 is a block diagram of a system for controlling charging of a low-voltage battery according to an exemplary embodiment of the present invention. Referring to FIG. 1, the system 100 for controlling charging of a low-voltage battery according to an exemplary embodiment of the present invention may include a fuel cell stack 120, a high-voltage direct current (DC) converter 130 configured to receive power from the fuel cell stack 120, a high-voltage battery 140 configured to receive a voltage down-converted by the high-voltage DC converter 130, a low-voltage DC converter (LDC) 150 connected to a high-voltage bus terminal between the fuel cell stack 120 and the high-voltage DC converter 130 and configured to down-convert a voltage, a low-voltage battery 160 charged by the voltage converted by the low-voltage DC converter 150, and a controller 110 configured to determine a state of charge (SOC) of the low-voltage battery based on a voltage of the low-voltage battery 160, determine a state of charge of the low-voltage battery 160 based on a magnitude of consumed power of the low-voltage DC converter 150 during a period in which vehicle start-up is performed, and setting a charged voltage of the low-voltage battery 160 based on a decision result on the state of charge of the low-voltage battery 160.

A detailed operation and acting effect of the system 100 for controlling charging of a low-voltage battery according to an exemplary embodiment of the present invention may be more clearly understood through the following description for a method for controlling charging of a low-voltage battery according to an exemplary embodiment of the present invention.

Figure 2:
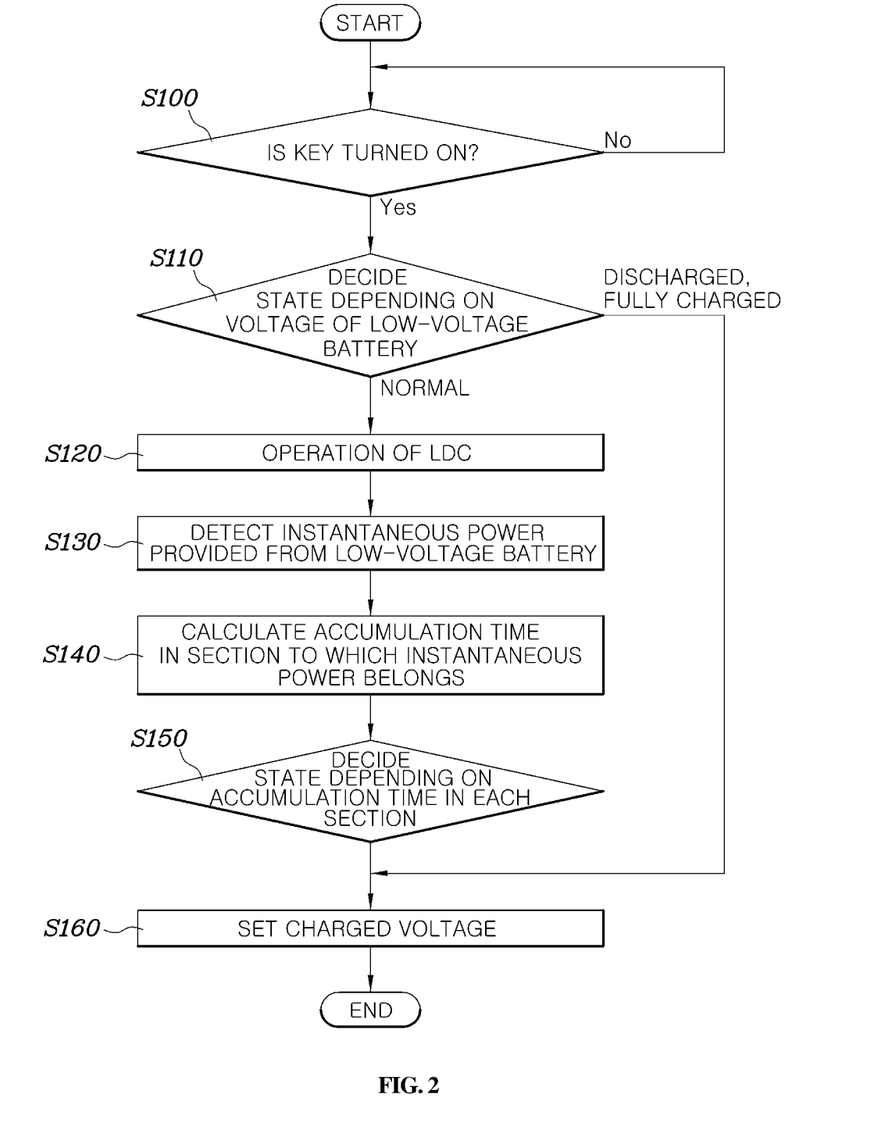
FIG. 2 is a flow chart illustrating a method for controlling charging of a low-voltage battery according to an exemplary embodiment of the present invention.

FIG. 2 is a flow chart illustrating a method for controlling charging of a low-voltage battery according to an exemplary embodiment of the present invention. Referring to FIG. 2, in the method for controlling charging of a low-voltage battery according to an exemplary embodiment of the present invention, when the vehicle is started up (S100), determining, by a controller 110, a state of charge of the low-voltage battery 160 based on a voltage of the low-voltage battery 160 in a no-load state before the LDC is operated (S110). In particular, the controller 110 may be configured to determine the state of charge of the low-voltage battery 160 based on a section to which the voltage of the low-voltage battery 160 belongs (e.g., corresponds to) among a plurality of sections sequentially divided based on a sequence of magnitudes of voltages.

Figure 3:
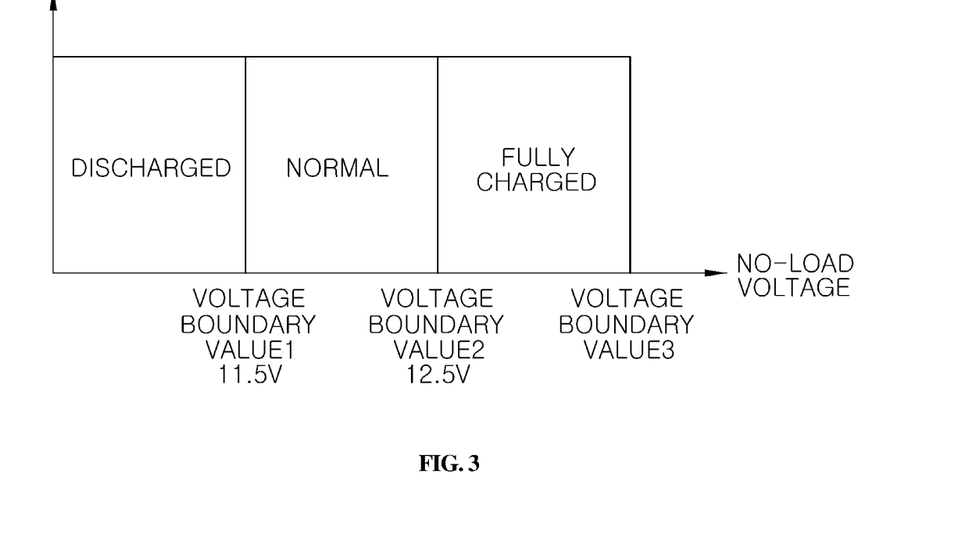
FIG. 3 is a view illustrating an example of a voltage section for determining a state of charge of the low-voltage battery according to an exemplary embodiment of the present invention.

FIG. 3 is a view illustrating an example of a voltage section for determining a state of charge of the low-voltage battery performed in the method for controlling charging of a low-voltage battery according to an exemplary embodiment of the present invention. As illustrated in FIG. 3, the controller 110 may be configured to determine the state of charge of the low-voltage battery 160 based on the section to which the voltage of the low-voltage battery 160 corresponds among three sections divided based on magnitudes of voltages using 11.5V and 12.5V as voltage boundary values.

For example, when the voltage of the low-voltage battery 160 is less than about 11.5V, the controller 110 may be configured to determine that the low-voltage battery 160 is in a discharged state, when the voltage of the low-voltage battery 160 is within a range of about 11.5V to 12.5V, the controller 110 may be configured to determine that the low-voltage battery 160 is in a normal state, and when the voltage of the low-voltage battery 160 is about 12.5V or greater, the controller 110 may be configured to determine that the low-voltage battery 160 is in a fully charged state. The boundary values between the respective sections illustrated in FIG. 3, which are provided by way of example for the purpose of the understanding of the present invention, may be appropriately adjusted, when necessary.

In response to determining that the low-voltage battery 160 is in the fully charged state or the discharged state, it may be considered that a state of the low-voltage battery may be sufficiently determined based on a voltage value of the low-voltage battery 160 in the no-load state. Therefore, the low-voltage battery 160 may be charged with a charged voltage preset with respect to the state of the low-voltage battery without performing a second determination process to be described below. Meanwhile, in response to determining that the voltage of the low-voltage battery 160 is in the normal state, a second determination process of more precisely determining a state of the low-voltage battery may be performed.

Particularly, the second determination process may be performed after determining that the state of the low-voltage battery 160 is the normal state and an operation of the LDC 150 is started to output a voltage having a preset magnitude (e.g., about 14V) (S120). In other words, the second determination process may be performed after the operation of the low-voltage DC converter (LDC) 150 configured to supply power to the low-voltage battery 160 is started after the vehicle start-up.

In particular, an output voltage of the LDC 150 may be adjusted to output the voltage having the preset magnitude (S120), consumed power output from the LDC 150 may be detected from a start point in time of the operation of the LDC 150 to a start-up completion section of the vehicle (S130), and an accumulation time in a section to which a magnitude of the consumed power output from the LDC 150 corresponds among a plurality of sections sequentially divided based on a sequence of magnitudes of power may be calculated (S140) to determine the state of the low-voltage battery 160 (S150).

Figure 4:
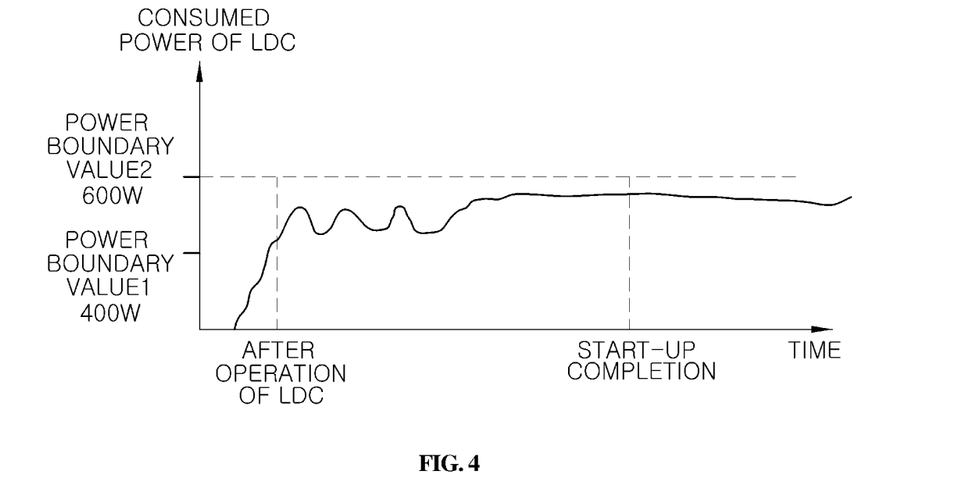
FIG. 4 is a view illustrating an example of a power section to which consumed power of a low-voltage direct current (DC) converter belongs according to an exemplary embodiment of the present invention.

FIG. 4 is a view illustrating an example of a power section to which consumed power of a low-voltage direct current (DC) converter corresponds, in the method for controlling charging of a low-voltage battery according to an exemplary embodiment of the present invention. As illustrated in FIG. 4, in the second determination process of the method for controlling charging of a low-voltage battery according to an exemplary embodiment of the present invention, the controller 110 may be configured to continuously detect consumed power values of the LDC 150 over time from a point in time in which the LDC is operated to the start-up completion point in time of the vehicle.

In particular, an entire range to which the consumed power values corresponds may include a plurality of sections sequentially divided based on magnitudes of power according to preset boundary values. In an example of FIG. 4, a power range may be divided into three sections using boundary values of 400 W and 600 W. For example, in a section in which power of the LDC 150 is less than about 400 W, which corresponds to when power of the LDC 150 consumed for charging the low-voltage battery is low, a state of charge of the low-voltage battery 160 may be determined to be the fully charged state, when power of the LDC 150 is within a range of about 400 W to 600 W, a state of charge of the low-voltage battery 160 may be determined to be the normal state, and when power of the LDC 150 is about 600 W or greater, which corresponds substantial power consumption to charge the battery, a state of charge of the low-voltage battery 160 may be determined to be the discharged state.

Meanwhile, in an exemplary embodiment of the present invention, setting of the boundary values between the plurality of sections sequentially divided based on a sequence of the magnitudes of the power, used in the second determination process, may be changed based on whether a high-load electric component receiving power from the low-voltage DC converter 150 at the time of the start-up of the vehicle is operated.

Figure 5:
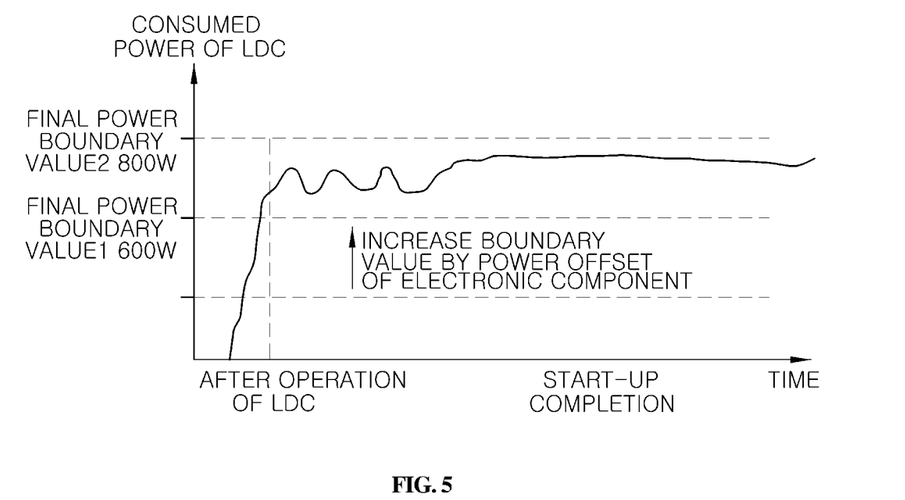
FIG. 5 is a view illustrating an example of changing the power section to which the consumed power of the low-voltage DC converter belongs according to an exemplary embodiment of the present invention.

FIG. 5 is a view illustrating an example of changing the power section to which the consumed power of the low-voltage DC converter corresponds, used in the second determination process performed in the method for controlling charging of a low-voltage battery according to an exemplary embodiment of the present invention. As illustrated in FIG. 5, in an exemplary embodiment of the present invention, when the controller 110 determines that the high-load electric component configured to receive the power from the low-voltage DC converter 150 during the vehicle start-up is operated, the controller 110 may be configured to reset the boundary values between power sections used in the second determination process. In other words, when the controller 110 determines that the high-load electric component configured to receive the power from the low-voltage DC converter 150 during the vehicle start-up is operated, the controller 110 may be configured to apply an offset value that corresponds to power required for operating the electric component to increase magnitudes of the boundary values for dividing the power sections.

For example, when the vehicle is started in a state in which a head lamp of the vehicle, which is one of the high-load electric components, is turned on, the controller 110 may be configured to set load power required for the head lamp to an offset and apply the offset to the boundary values between the power sections in the no-load state as illustrated in FIG. 4 to increase a determination reference of the state of the battery. An example of the high-load electric component may include the head lamp, an air conditioning fan, a wiper, a heat line, and the like, and the controller 110 may be configured to receive information regarding whether a high-load electric component is operated via a controller area network (CAN) communication scheme or another scheme.

After the state of charge of the low-voltage battery 160 is determined in the first determination process (S110) or the second determination process (S120 to S150) as described above, the controller may be configured to set a charged voltage of the low-voltage battery 160 (S160). In particular, a base charged voltage of the low-voltage battery may be set based on a determination result of the state of charge of the low-voltage battery 160. Further, the charged voltage for the low-voltage battery 160 may then be determined by the controller based on the base charged voltage and a driving mode of the vehicle. The setting process (S160) of the charged voltage of the low-voltage battery 160 described above may be more clearly understood through FIGS. 6 and 7.

Figure 6:
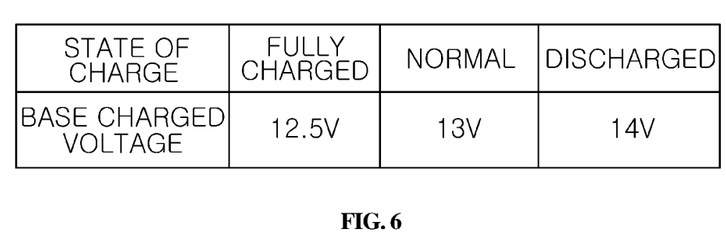
FIG. 6 is a table illustrating an example of a base charged voltage of each state of charge of the low-voltage battery, used in the method for controlling charging of a low-voltage battery according to an exemplary embodiment of the present invention.
Figure 7:
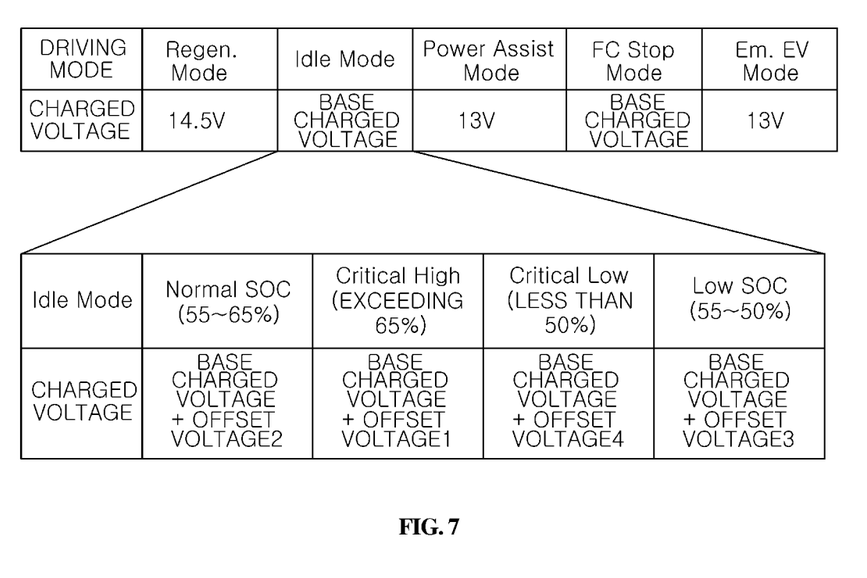
FIG. 7 is a table illustrating an example of a method for setting a charged voltage of the low-voltage battery in each driving mode, used in the method for controlling charging of a low-voltage battery according to an exemplary embodiment of the present invention.

FIG. 6 is a table illustrating an example of a base charged voltage of each state of charge of the low-voltage battery, used in the method for controlling charging of a low-voltage battery according to an exemplary embodiment of the present invention, and FIG. 7 is a table illustrating an example of a method for setting a charged voltage of the low-voltage battery in each driving mode, used in the method for controlling charging of a low-voltage battery according to an exemplary embodiment of the present invention. As illustrated in FIG. 6, the state of charge of the low-voltage battery may be determined to be any one of the fully charged state, the normal state, and the discharged state through the first determination process and the second determination process described above.

The base charged voltage may be set to a first charged voltage (e.g., about 12.5V) in response to determining that the state of charge of the low-voltage battery 160 is the fully charged state, may be set to a second charged voltage (e.g., about 13V) in response to determining that the state of charge of the low-voltage battery 160 is the normal state, and may be set to a third charged voltage (e.g., about 14V) in response to determining that that the state of charge of the low-voltage battery 160 is the discharged state. Particularly, the first charged voltage may be less than the second charged voltage and the third charged voltage. In addition, the second charged voltage may be greater than the first charged voltage and may be less than the third charged voltage, and the third charged voltage may be greater than the first charged voltage and the second charged voltage.

Furthermore, through the setting of the base charged voltage described above, when discharging of the low-voltage battery 160 occurs, the base charged voltage may be set to be high to set the charged voltage for the low-voltage battery 160 to be high, thereby making it possible to prevent the discharging of the low-voltage battery 160. When the low-voltage battery is fully charged, the base charged voltage may be set to be low to lower the charged voltage for the low-voltage battery, thereby making it possible to prevent the low-voltage battery 160 from being excessively charged.

Meanwhile, as illustrated in FIG. 7, in an exemplary embodiment of the present invention, the charged voltage of the low-voltage battery may be set based on various driving modes according to the base charged voltage described above. For example, the driving mode may include a regeneration mode, an idle mode, a power assist mode, a fuel cell (FC) stop mode, an emergency electric vehicle (EV) mode, and the like.

The regeneration mode is a mode of recovering regenerative braking energy from a driving motor of the vehicle. In particular, the regeneration mode is a mode of converting kinetic energy of the vehicle into electrical energy through power generation of a motor during deceleration or braking to charge a high-voltage battery. When a brake pedal is engaged (e.g., when pressure is exerted onto a brake pedal), the driving mode of the vehicle may be switched from the idle mode into the regeneration mode to recover the regenerative braking energy from the motor. In addition, when an acceleration pedal is engaged (e.g., when pressure is exerted onto an acceleration pedal) to normally drive the vehicle in the regeneration mode, the driving mode of the vehicle may again be switched into the idle mode. In the regeneration mode, the charged voltage may be set to a predetermined voltage (e.g., about 14.5V) regardless of the base charged voltage.

Additionally, the idle mode indicates a general driving mode, is a mode indicating that the vehicle is being driven, and indicates a driving mode except for the regeneration mode described above and a power assist mode to be described below. The idle mode may be divided into a plurality of stages based on a state of charge (SOC) of the high-voltage battery 140. For example, the plurality of stages may include four stages divided based on the stage of charge (SOC) of the high-voltage battery 140. Particularly, the four stages may include a normal stage when the SOC of the high-voltage battery is about 55% to 65%, a critical high stage when the SOC of the high-voltage battery is greater than about 65%, a critical low stage when the SOC of the high-voltage battery is less than about 50%, and a low stage when the SOC of the high-voltage battery is about 50% to 55%. In each stage, the charged voltage of the low-voltage battery 160 may be set by adding an offset voltage preset in each stage to the base charged voltage described above.

The power assist mode simultaneously uses power of a fuel cell and power of the high voltage battery, and is a driving mode in which the accelerator pedal is engaged to a preset depth or greater or the power of the fuel cell reaches preset power. When the accelerator pedal is engaged to the preset depth or greater while driving the vehicle in the idle mode or the power of the fuel cell reaches the preset power, the driving mode of the vehicle may be switched into the power assist mode, and may also be reversely switched. In the power assist mode, the charged voltage may be set to a predetermined voltage (e.g., about 13 V) regardless of the base charged voltage.

The fuel cell stop mode indicates a mode in which the vehicle is driven using the high voltage battery by stopping the fuel cell in a low power section or a section in which a speed is low. When the vehicle is driven in the low power section, a voltage of the fuel cell increases causing a negative effect on durability of the fuel cell. Therefore, in the low power section, the fuel cell may be stopped. Generally, the driving mode of the vehicle may be switched from the idle mode into the regeneration mode when a speed of the vehicle is reduced to brake the vehicle, may be switched into the fuel cell stop mode when the vehicle is completely stopped, and may be switched into the idle mode by re-driving the fuel cell when a speed of the vehicle is greater than a predetermined speed or the power of the fuel cell exceeds predetermined power. In the fuel cell stop mode, the base charged voltage may be applied as the charged voltage of the low-voltage battery as it is. The emergency EV mode indicates an emergency mode in which the vehicle is driven by the high-voltage battery in which a failure occurs in a fuel cell system. In the emergency EV mode, the charged voltage may be set to a predetermined voltage (e.g., about 13 V) regardless of the base charged voltage.

As described above, in an exemplary embodiment of the present invention, the charged voltages for charging the low-voltage battery may be set to be different based on the base charged voltage, the driving mode of the vehicle, and the state of charge of the high-voltage battery, thereby making it possible to improve fuel efficiency of fuel cell and hybrid vehicles. However, numerical values of the charged voltages set as described above and numerical values indicating degrees of the SOC of the high-voltage battery dividing the stages are merely examples, and are not limited thereto, but may be variously modified.

As described above, in the method and the system for controlling charging of a low-voltage battery according to several exemplary embodiments of the present invention, the charged voltage of the low-voltage battery may be set based on the state of charge of the low-voltage battery to prevent the discharging of the low-voltage battery, thereby making it possible to improve a start-up property. Particularly, in various exemplary embodiments of the present invention, the state of charge of the low-voltage battery may be determined based on a change in power provided to the low-voltage battery after the operation of the low-voltage DC converter is started as well as the voltage of the low-voltage battery, thereby making it possible to determine the state of charge of the low-voltage battery according to a deterioration state of the low-voltage battery, a surrounding temperature, or the like. Therefore, the state of the low-voltage battery may be more precisely determined, and the discharging of the low-voltage battery may be prevented, thereby making it possible to further improve the start-up property and the fuel efficiency.

In addition, in various exemplary embodiments of the present invention, when the high-load electric component is being operated when the operation of the low-voltage DC converter is started, a reference for determining the state of the low-voltage battery may be changed based on the use of the power in consideration of load power based on the high-load electric component that is being operated, thereby making it possible to more precisely determine the state of the low-voltage battery.

Although the present invention has been illustrated and described with respect to specific exemplary embodiments, it will be obvious to those skilled in the art that the present invention may be variously modified and altered without departing from the spirit and scope of the present invention as defined by the following claims.

What is claimed is:

1. A method for controlling charging of a low-voltage battery, comprising:
   determining, by a controller, a state of charge of the low-voltage battery of a vehicle based on a voltage of the low-voltage battery;
   determining, by the controller, a state of charge of the low-voltage battery based on a magnitude of consumed power of a low-voltage direct current (DC) converter (LDC) configured to provide charged power to the low-voltage battery during a period in which vehicle start-up is performed;
   selecting, by the controller, either the state of charge of the low-voltage battery determined based on the voltage of the low-voltage battery, when the low-voltage battery is either fully charged or discharged, or the state of charge of the low-voltage battery determined based on the magnitude of consumed power of a low-voltage direct current converter to be used to set a charged voltage of the low-voltage battery, when the low-voltage battery is at a normal level; and
   setting, by the controller, the charged voltage of the low-voltage battery based on a determination result of the selected state of charge of the low-voltage battery.

2. The method for controlling charging of a low-voltage battery of claim 1, wherein the state of charge of the low-voltage battery may be determined based on a section to which the voltage of the low-voltage battery corresponds among a plurality of sections sequentially divided based on a sequence of magnitudes of voltages.

3. The method for controlling charging of a low-voltage battery of claim 1, wherein the determination of the state of charge of the low-voltage battery based on the magnitude of consumed power is performed when the state of charge of the low-voltage battery is determined as a normal state based on the state of charge of the low-voltage battery determined based on the voltage of the low-voltage battery.

4. The method for controlling charging of a low-voltage battery of claim 1, wherein in the determination of the state of charge of the low-voltage battery based on the magnitude of consumed power, the magnitude of the consumed power of the low-voltage DC converter is determined from a point in time in which an operation of the low-voltage DC converter configured to supply the power to the low-voltage battery is started after initiation of the vehicle start-up to a point in time which in which the vehicle start-up is completed.

5. The method for controlling charging of a low-voltage battery of claim 1, wherein in the determination of the state of charge of the low-voltage battery based on the magnitude of consumed power, the state of charge of the low-voltage battery is determined based on an accumulation time in a section to which the magnitude of the consumed power of the low-voltage DC converter corresponds among a plurality of sections sequentially divided based on a sequence of magnitudes of power.

6. The method for controlling charging of a low-voltage battery of claim 5, wherein boundary values between the plurality of sections sequentially divided based on the sequence of the magnitudes of the power are set based on whether a high-load electric component configured to receive the power from the low-voltage DC converter during the vehicle start-up is operated.

7. The method for controlling charging of a low-voltage battery of claim 1, wherein the setting of charged voltage includes:
   setting, by the controller, a base charged voltage of the low-voltage battery based on the determination result of the state of charge of the low-voltage battery; and
   setting, by the controller, the charged voltage for the low-voltage battery based on the base charged voltage and a driving mode of the vehicle.

8. The method for controlling charging of a low-voltage battery of claim 7, wherein the driving mode includes a plurality of modes, and at least one of which the charged voltage is set by adding an offset value preset based on a state of charge of a high-voltage battery to the base charged voltage.

9. A method for controlling charging of a low-voltage battery, comprising:
   determining, by a controller, a state of charge of the low-voltage battery of a vehicle based on a section to which a voltage of the low-voltage battery corresponds among a plurality of sections sequentially divided based on a sequence of magnitudes of voltages in a no-load state at an early state of vehicle start-up;
   determining, by the controller, a state of charge of the low-voltage battery based on an accumulation time in a section to which a magnitude of consumed power of a low-voltage direct-current (DC) converter (LDC) configured to provide charged power to the low-voltage battery corresponds among a plurality of sections sequentially divided based on a sequence of magnitudes of power during a period in which the vehicle start-up is performed;
   selecting, by the controller, either the state of charge of the low-voltage battery determined based on the voltage of the low-voltage battery, when the low-voltage battery is either fully charged or discharged, or the state of charge of the low-voltage battery determined based on the magnitude of consumed power of a low-voltage direct current converter to be used to set a base charged voltage of the low-voltage battery, when the low-voltage battery is at a normal level;
   setting, by the controller, a base charged voltage of the low-voltage battery based on a determination result of the selected state of charge of the low-voltage battery; and
   setting, by the controller, a charged voltage for the low-voltage battery based on the base charged voltage and a driving mode of the vehicle.

10. The method for controlling charging of a low-voltage battery of claim 9, wherein the determination of the state of charge of the low-voltage battery based on the accumulation time is performed when the state of charge of the low-voltage battery determined based on the voltage section is a state between a fully charged state and a discharged state.

11. The method for controlling charging of a low-voltage battery of claim 9, wherein boundary values between the plurality of sections sequentially divided based on the sequence of the magnitudes of the power are set based on whether a high-load electric component configured to receive the power from the low-voltage DC converter during the vehicle start-up is operated.

12. The method for controlling charging of a low-voltage battery of claim 9, wherein the driving mode includes a plurality of modes, and at least one of which the charged voltage is set by adding an offset value preset based on a state of charge of a high-voltage battery to the base charged voltage.

13. A system for controlling charging of a low-voltage battery, comprising:
   a fuel cell stack;
   a high-voltage direct current (DC) converter configured to receive power from the fuel cell stack;
   a high-voltage battery configured to receive a voltage down-converted by the high-voltage DC converter;
   a low-voltage DC converter (LDC) connected to a high-voltage bus terminal between the fuel cell stack and the high-voltage DC converter and configured to down-convert a voltage;
   a low-voltage battery configured to be charged by the voltage converted by the low-voltage DC converter; and
   a controller configured to determine a state of charge of the low-voltage battery based on a voltage of the low-voltage battery, determine a state of charge of the low-voltage battery based on a magnitude of consumed power of the low-voltage DC converter during a period in which vehicle start-up is performed, select either the state of charge of the low-voltage battery determined based on the voltage of the low-voltage battery, when the low-voltage battery is either fully charged or discharged, or the state of charge of the low-voltage battery determined based on the magnitude of consumed power of a low-voltage direct current converter to be used to set a charged voltage of the low-voltage battery, when the low-voltage battery is at a normal level; and set the charged voltage of the low-voltage battery based on a determination result of the selected state of charge of the low-voltage battery.

* * * * *